(12) United States Patent
Kosakamoto et al.

(10) Patent No.: US 9,082,450 B2
(45) Date of Patent: Jul. 14, 2015

(54) SPINDLE MOTOR AND DISK DRIVE APPARATUS

(71) Applicant: Nidec Corporation, Kyoto (JP)

(72) Inventors: Yuji Kosakamoto, Kyoto (JP); Taisuke Kanemasa, Kyoto (JP); Masaaki Nakagawa, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 14/339,529

(22) Filed: Jul. 24, 2014

(65) Prior Publication Data

US 2015/0036475 A1 Feb. 5, 2015

Related U.S. Application Data

(60) Provisional application No. 61/864,763, filed on Aug. 12, 2013.

(51) Int. Cl.
| | |
|---|---|
| *G11B 19/20* | (2006.01) |
| *H02K 3/46* | (2006.01) |
| *H02K 5/04* | (2006.01) |
| *H02K 5/22* | (2006.01) |
| *F16C 33/74* | (2006.01) |
| *F16C 17/10* | (2006.01) |
| *G11B 33/12* | (2006.01) |

(52) U.S. Cl.
CPC .......... *G11B 19/2036* (2013.01); *F16C 17/107* (2013.01); *F16C 33/745* (2013.01); *G11B 19/2009* (2013.01); *H02K 3/46* (2013.01); *H02K 5/04* (2013.01); *H02K 5/225* (2013.01)

(58) Field of Classification Search
CPC ........... G11B 19/2009; G11B 19/2045; G11B 19/2036; G11B 33/122; H02K 5/225; H02K 3/522; H02K 2211/03; H02K 2203/03; H02K 2203/06; H02K 3/46; H02K 5/04; F16C 33/745; F16C 17/107
USPC .......................... 360/99.08; 310/67 R, 90, 71
See application file for complete search history.

(56) References Cited

U.S. PATENT DOCUMENTS

| | | | |
|---|---|---|---|
| 7,684,146 B1 | 3/2010 | Andrikowich et al. | |
| 7,757,378 B1 | 7/2010 | Mann et al. | |
| 8,922,945 B2 * | 12/2014 | Saeki et al. | 360/99.08 |
| 2001/0006442 A1 | 7/2001 | Komatsu et al. | |
| 2005/0206255 A1 | 9/2005 | Yoshino et al. | |
| 2006/0138886 A1 | 6/2006 | Ito et al. | |

(Continued)

FOREIGN PATENT DOCUMENTS

| | | |
|---|---|---|
| DE | 10 2012 016 001 A1 | 5/2014 |
| JP | 07-075312 A | 3/1995 |

(Continued)

*Primary Examiner* — Will J Klimowicz
(74) *Attorney, Agent, or Firm* — Keating & Bennett, LLP

(57) ABSTRACT

A spindle motor includes a stationary portion and a rotating portion. The stationary portion includes a base member, a stator core, coils, and a circuit board. The base member includes a middle region, a peripheral region, jetty portions, a recessed portion, and at least one through hole. The jetty portions are positioned at least axially below the peripheral region, and include a pair of extension portions. The recessed portion is arranged inside the jetty portions, and a portion of the circuit board is arranged in the recessed portion. The at least one through hole is arranged to pass through the middle region in an axial direction. The recessed portion is covered with a sealant.

10 Claims, 5 Drawing Sheets

(56) References Cited

U.S. PATENT DOCUMENTS

| | | |
|---|---|---|
| 2009/0195095 A1 | 8/2009 | Yawata et al. |
| 2009/0316299 A1 | 12/2009 | Tashiro et al. |
| 2010/0329104 A1 | 12/2010 | Yawata et al. |
| 2011/0122530 A1 | 5/2011 | Sekii et al. |
| 2011/0249362 A1 | 10/2011 | Saichi et al. |
| 2012/0075746 A1 | 3/2012 | Yoneda et al. |
| 2012/0153750 A1* | 6/2012 | Kim et al. ................. 310/71 |
| 2012/0200957 A1* | 8/2012 | Yawata ................. 360/99.08 |
| 2014/0153132 A1* | 6/2014 | Sato et al. ................. 360/99.08 |
| 2014/0362469 A1* | 12/2014 | Taki et al. ................. 360/99.08 |
| 2014/0362470 A1* | 12/2014 | Taki et al. ................. 360/99.08 |

FOREIGN PATENT DOCUMENTS

| | | |
|---|---|---|
| JP | 07-222386 A | 8/1995 |
| JP | 2000-209804 A | 7/2000 |
| JP | 2001-065552 A | 3/2001 |
| JP | 2001-067775 A | 3/2001 |
| JP | 2005-245141 A | 9/2005 |
| JP | 2009-110611 A | 5/2009 |
| JP | 2009-189157 A | 8/2009 |
| JP | 2010-213476 A | 9/2010 |

* cited by examiner

SPINDLE MOTOR AND DISK DRIVE APPARATUS

BACKGROUND OF THE INVENTION

1. Field of the Invention

The present invention relates to a spindle motor and a disk drive apparatus.

2. Description of the Related Art

Spindle motors arranged to rotate disks are installed in hard disk drive apparatuses and optical disk drive apparatuses. Such a spindle motor includes a stationary portion fixed to a housing of the apparatus, and a rotating portion arranged to rotate while supporting the disk(s). While the spindle motor is running, a torque centered on a rotation axis is produced by magnetic flux generated between the stationary portion and the rotating portion, so that the rotating portion is caused to rotate with respect to the stationary portion.

Here, JP-A 2009-189157 discloses the following structure: "a connection portion of a flexible circuit board connected with an armature is accommodated in a recessed portion defined in a middle region 213 of a lower surface of a base plate of a motor, and a led-out portion extending from the connection portion is arranged in a groove portion arranged to join the recessed portion and a peripheral region arranged around the middle region. The connection portion is covered with a resin layer defined as a result of a thermosetting adhesive being cured". This structure prevents a fluid resin material from overflowing into the peripheral region.

However, when the connection portion of the flexible circuit board is arranged directly under the motor as is the case with the above structure, it is impossible to minimize the height of the motor to achieve a reduction in the axial thickness thereof. On the other hand, an attempt to reduce the thickness of the base plate for the accommodation of the connection portion of the flexible circuit board leads to a problem of a reduction in rigidity of the base plate.

SUMMARY OF THE INVENTION

A spindle motor according to a preferred embodiment of the present invention includes a stationary portion and a rotating portion. The rotating portion is arranged to be rotatable about a rotation axis extending in a vertical direction with respect to the stationary portion. The stationary portion includes a base member, a stator core, coils, and a circuit board. The base member is arranged to extend in directions perpendicular or substantially perpendicular to the rotation axis. The stator core is arranged axially above the base member. The coils are attached to the stator core, and include lead wires. The circuit board is arranged on a lower surface of the base member. The base member includes a middle region, a peripheral region, jetty portions, a recessed portion, and at least one through hole. The middle region is a flat surface arranged to surround the rotation axis. The peripheral region is positioned radially outside the middle region, and is positioned axially above the middle region. The jetty portions are positioned at least axially below the peripheral region. The jetty portions include a pair of extension portions and arm portions. Each of the extension portions is continuous with the middle region and is arranged to extend in a direction away from the rotation axis. Each of the arm portions is arranged to extend from a tip portion of a separate one of the pair of extension portions in a direction different from a direction in which a corresponding one of the extension portions extends. The recessed portion is arranged inside the jetty portions, and a portion of the circuit board is arranged in the recessed portion. The at least one through hole is arranged to pass through the middle region in an axial direction. The lead wires of the coils are passed through the at least one through hole to reach a lower side of the base member, and are electrically connected to the circuit board. The recessed portion is covered with a sealant.

The spindle motor according to the above preferred embodiment of the present invention is able to prevent an overflow of an adhesive while achieving a reduction in the thickness of the base member.

The above and other features, elements, steps, characteristics and advantages of the present invention will become more apparent from the following detailed description of preferred embodiments of the present invention with reference to the attached drawings. The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

It is assumed herein that a direction parallel to or substantially parallel to a rotation axis of a spindle motor is referred to by the term "axial direction", "axial", or "axially", that directions perpendicular to or substantially perpendicular to the rotation axis of the spindle motor are each referred to by the term "radial direction", "radial", or "radially", and that a direction along or substantially along a circular arc centered on the rotation axis of the spindle motor is referred to by the term "circumferential direction", "circumferential", or "circumferentially". It is also assumed that a position closer to the rotation axis of the spindle motor is referred to as an "inside", and that a position farther away from the rotation axis of the spindle motor is referred to as an "outside". It is also assumed herein that an axial direction is a vertical direction, and that a side on which a stator is arranged with respect to a base member is defined as an upper side. The shape of each member or portion and relative positions of different members or portions will be described based on the above assumptions. It should be noted, however, that the above definitions of the various directions are not meant to restrict in any way the orientation of a spindle motor or a disk drive apparatus according to any preferred embodiment of the present invention when in use.

Figure 1:
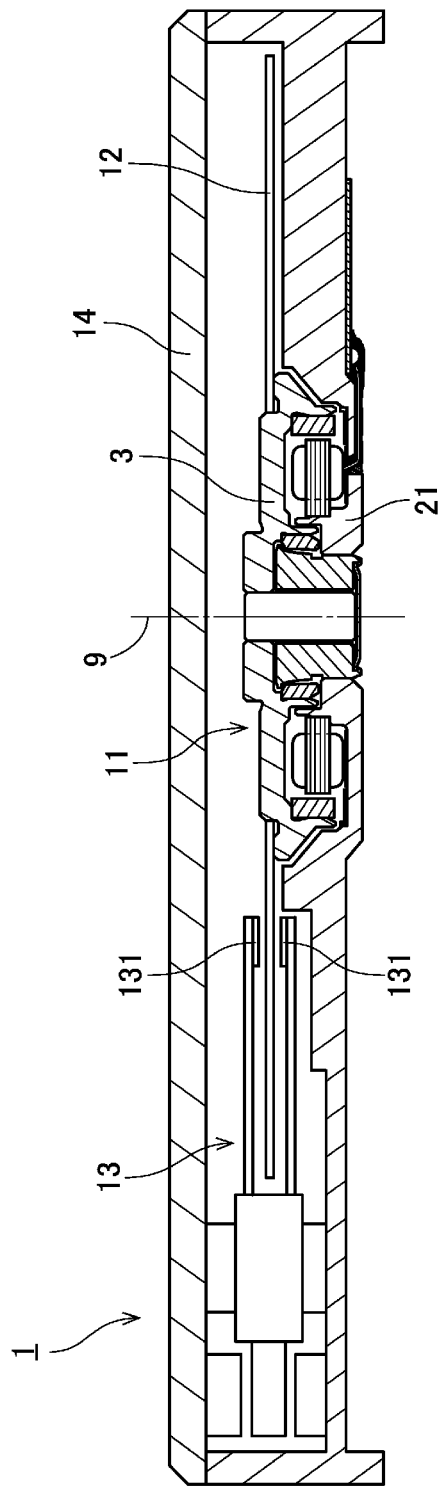
FIG. 1 is a vertical cross-sectional view of a disk drive apparatus according to a first preferred embodiment of the present invention.

FIG. 1 is a vertical cross-sectional view of a disk drive apparatus 1 according to a first preferred embodiment of the present invention. The disk drive apparatus 1 is preferably, for example, an apparatus arranged to rotate a magnetic disk 12 and perform at least one of reading and writing of information from or to the magnetic disk 12. As illustrated in FIG. 1, the disk drive apparatus 1 preferably includes a spindle motor 11, at least one magnetic disk 12, an access portion 13, and a cover 14.

The spindle motor 11 is arranged to support the magnetic disk 12 and rotate the magnetic disk 12 about a rotation axis 9. The spindle motor 11 includes a base member 21 (see FIG. 2) arranged to extend in directions perpendicular or substantially perpendicular to the rotation axis 9. The base member 21 is in or substantially in the shape of a plate. A housing is in or substantially in the shape of a case, and is preferably defined by the base member 21 and the cover 14. An upper portion of the base member 21 is covered with the cover 14. A rotating portion 3 of the spindle motor 11, the magnetic disk 12, and the access portion are accommodated in the housing. The access portion 13 is arranged to move at least one head 131 along recording surfaces of the magnetic disk 12 to perform the reading and writing of information from or to the magnetic disk 12.

Figure 2:
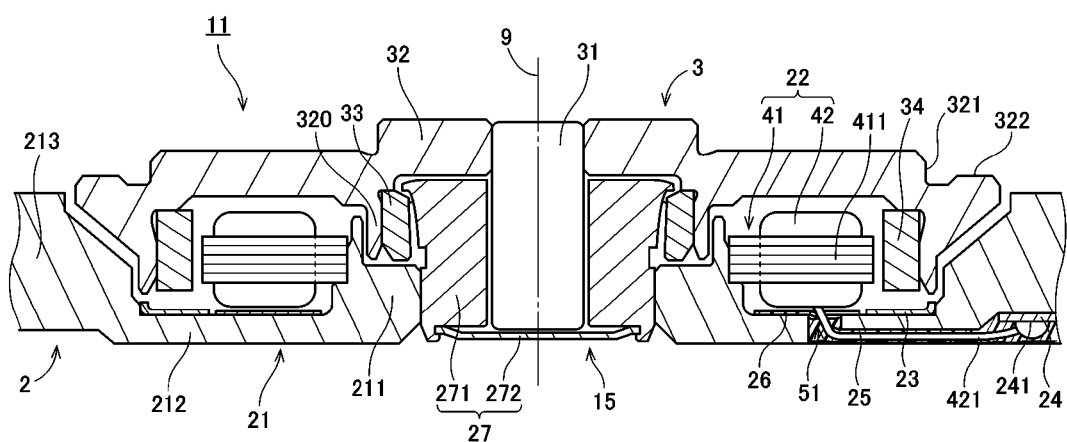
FIG. 2 is a vertical cross-sectional view of a spindle motor according to the first preferred embodiment of the present invention.

Next, the structure of the spindle motor 11 will be described in more detail below. FIG. 2 is a vertical cross-sectional view of the exemplary spindle motor 11 according to a first preferred embodiment of the present invention. As illustrated in FIG. 2, the spindle motor 11 includes a stationary portion 2 and the rotating portion 3. The rotating portion 3 is arranged to be rotatable with respect to the stationary portion 2. In more detail, the rotating portion 3 is arranged to be rotatable about the rotation axis 9 extending in the vertical direction with respect to the stationary portion 2. The stationary portion 2 is arranged to be stationary relative to both the base member 21 and the cover 14.

In this preferred embodiment, the stationary portion 2 preferably includes the base member 21, a stator 22, a magnetic member 23, a circuit board 24, first insulation sheet portions 25, a second insulation sheet portion 26, and a bearing unit 27.

The base member 21 is preferably a plate-shaped or substantially plate-shaped member, and is arranged to extend in the directions perpendicular or substantially perpendicular to the rotation axis 9. As illustrated in FIG. 1, the base member 21 is arranged on a lower side of the rotating portion 3, the magnetic disk 12, and the access portion 13. The base member 21 is preferably defined by, for example, subjecting a metallic part to a forging process. A material of the base member 21 used is, for example, an aluminum alloy, ferromagnetic or nonmagnetic stainless steel, a magnesium alloy, or the like. Note that the base member 21 may alternatively be defined by another method such as a cutting process, press working, or the like, for example. Also note that the base member 21 may be made up of a plurality of members.

The base member 21 preferably includes a cylindrical portion 211, a middle region 212, and a peripheral region 213. The middle region 212 is a flat surface arranged to surround the rotation axis, and is positioned below the stator 22. Meanwhile, the cylindrical portion 211 is arranged to extend upward from a radially inner edge portion of the middle region 212. That is, the middle region 212 is an annular or substantially annular flat surface, and is arranged to extend in a circumferential direction around the cylindrical portion 211. The peripheral region 213 is positioned radially outside the middle region 212, and is positioned axially above the middle region 212.

The base member 21 further includes at least one through hole 51 passing through the base member 21 from an upper surface to a lower surface thereof. Note that, in this preferred embodiment, the number of through holes 51 is preferably two.

The stator 22, the magnetic member 23, the second insulation sheet portion 26, and so on are positioned axially above the base member 21. Preferably, the stator 22, the magnetic member 23, and the second insulation sheet portion 26 are arranged axially above the middle region 212.

The stator 22 preferably includes a stator core 41 and a plurality of coils 42. The stator core 41 and the plurality of coils 42 are positioned above the middle region 212. The stator core 41 is preferably defined, for example, by laminated steel sheets, that is, electromagnetic steel sheets, such as silicon steel sheets, placed one upon another in the axial direction. The stator core 41 is fixed to an outer circumferential surface of the cylindrical portion 211. The stator core 41 includes a plurality of teeth 411. The teeth 411 are preferably arranged at regular or substantially regular intervals in the circumferential direction.

The coils 42 are attached to the stator core 41, and include a plurality of lead wires 421. More specifically, each coil 42 is defined by a conducting wire wound around a separate one of the teeth 411. The coils 42 are preferably defined by three conducting wires used to supply currents for three phases. In this preferred embodiment, the coils 42 include four lead wires 421 used for a U phase, a V phase, a W phase, and common, respectively. Each lead wire 421 is an end portion of one of the conducting wires. Each lead wire 421 is preferably passed through one of the through holes 51 to reach a lower side of the base member 21, and is electrically connected to the circuit board 24. In this preferred embodiment, each lead wire 421 is led from an upper side to the lower side of the base member 21, with two of the lead wires 421 passing through each through hole 51, and is electrically connected to the circuit board 24.

The magnetic member 23 is an annular or substantially annular member, and is arranged on an upper surface of the middle region 212. A magnetic material, such as an electromagnetic steel sheet (e.g., a silicon steel sheet), a ferromagnetic stainless steel (e.g., SUS430), a cold-rolled steel sheet (e.g., SPCC or SPCE), or the like, for example, is preferably used as a material of the magnetic member. The magnetic member 23 is positioned under a magnet 34 described below. A magnetic attraction force is generated between the magnetic member 23 and the magnet 34. The rotating portion 3 is thereby attracted toward the stationary portion 2. This results in a reduction in the likelihood that the rotating portion 3 will move in the axial direction relative to the stationary portion 2 due to application of an external shock or the like to the motor 11.

The circuit board 24 is arranged on the lower surface of the base member 21. At least one land portion 241, where a copper foil is exposed, is arranged in a lower surface of the circuit board 24. In this preferred embodiment, the number of land portions 241 is preferably four. The four lead wires 421, each of which is drawn out through one of the two through holes 51, are soldered to the four land portions 241, respectively. Both a lead solder and a lead-free solder are preferably used in this soldering process. The circuit board 24 and the coils 42 are thereby electrically connected to each other. The wording "to be electrically connected" as used herein means to be in electrical continuity. This allows electrical drive currents to be supplied from an external power supply to the coils 42 through the circuit board 24 while the spindle motor 11 is running.

Note that the number of lead wires 421 drawn out through each through hole 51 is not limited to two. That is, the number may be more than two or less than two. Depending on the number of through holes 51, only one of the lead wires may be drawn out through each through hole 51.

In this preferred embodiment, a flexible printed circuit board is preferably used as the circuit board 24. The flexible printed circuit board preferably has flexibility. Use of the flexible printed circuit board enables the circuit board 24 to be arranged along the lower surface of the base member 21. In addition, the use of the flexible printed circuit board leads to a reduction in the axial thickness of the circuit board 24 itself compared to the case where a circuit board of another type is used, for example. This in turn leads to an additional reduction in the axial thickness of the spindle motor 11.

The bearing unit 27 preferably includes a sleeve 271 and a cap 272. The sleeve 271 is cylindrical or substantially cylindrical, extending in the axial direction. A shaft 31 (described below) is inserted through a through hole of the sleeve 271. The shaft 31 is preferably a columnar or substantially columnar member. A lower portion of the sleeve 271 is arranged in a through hole of the cylindrical portion 211. The sleeve 271 is fixed to the cylindrical portion 211 through, for example, an adhesive or the like. An inner circumferential surface of the sleeve 271, which defines the through hole thereof, is radially opposed to an outer circumferential surface of the shaft 31. Meanwhile, the cap 272 is arranged to close a lower opening of the sleeve 271. In this preferred embodiment, the cap 272 is fixed by a portion of the lower portion of the sleeve 271. Note that the sleeve 271 may alternatively be defined by a plurality of members, if so desired.

The rotating portion 3 preferably includes the shaft 31, a hub 32, an annular member 33, and the magnet 34.

The shaft 31 is arranged to extend in the axial direction and pass through the through hole of the sleeve 271. A metal such as, for example, a ferromagnetic or nonmagnetic stainless steel or the like is preferably used as a material of the shaft 31. An upper end portion of the shaft 31 is positioned above an upper surface of the sleeve 271.

Figure 3:
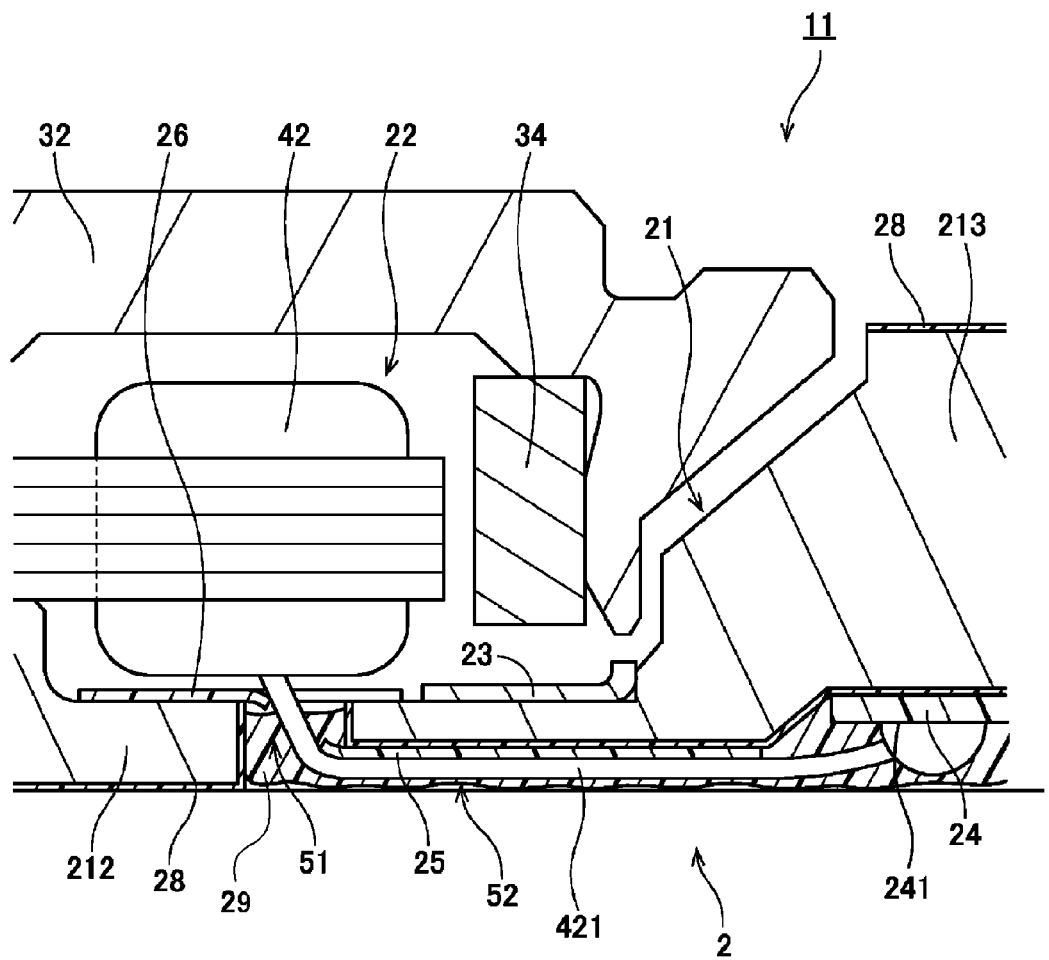
FIG. 3 is a partial enlarged view of a vertical section of the spindle motor according to the first preferred embodiment of the present invention.

The hub 32 is a cup-shaped or substantially cup-shaped member. The hub 32 preferably includes a circular plate portion. A through hole in which the upper end portion of the shaft 31 is fixed is arranged in the circular plate portion. As illustrated in FIG. 3, the hub 32 preferably includes an annular projecting portion 320 arranged to extend downward. In more detail, the annular projecting portion 320 is annular or substantially annular, and is arranged to extend in the axial direction from a lower surface of the circular plate portion. The annular projecting portion 320 is positioned radially outward of an outer circumferential surface of the sleeve 271. The annular member 33 is fixed to an inner circumferential surface of the annular projecting portion 320 through, for example, press fitting, adhesion, or the like. An inner circumferential surface of the annular member 33 is arranged radially opposite the outer circumferential surface of the sleeve 271.

In addition, the hub 32 preferably includes a cylindrical or substantially cylindrical first holding surface 321 and a second holding surface 322. The first holding surface 321 is a surface extending downward from an outer circumferential edge of the circular plate portion. The second holding surface 322 is annular or substantially annular, and is arranged to extend radially outward from a lower end portion of the first holding surface 321. An inner circumferential portion of a hole of the magnetic disk 12 is arranged to be in contact with at least a portion of the first holding surface 321. In addition, a lower surface of the magnetic disk 12 is arranged to be in contact with at least a portion of the second holding surface 322. The magnetic disk 12 is thereby held by the hub 32.

A lubricating fluid is arranged to intervene between the stationary bearing unit 27 and the shaft 31, the hub 32, and the annular member 33. In more detail, the lubricating fluid is arranged to intervene between the outer circumferential surface of the shaft 31 and an inside surface of the through hole of the sleeve 271, between a lower surface of the hub 32 (the lower surface of the circular plate portion) and the upper surface of the sleeve 271, between the annular member 33 and an outside surface of the sleeve 271, and between the cap 272 and a lower surface of the sleeve 271. A liquid surface of the lubricating fluid is located in a gap between the sleeve 271 and the annular member 33 or the like. A polyolester oil, a diester oil, or the like, for example, is used as the lubricating fluid. The shaft 31 is supported to be rotatable with respect to the bearing unit 27 through the lubricating fluid.

That is, in this preferred embodiment, a bearing mechanism 15 is preferably defined by the sleeve 271 and the cap 272, which are members of the stationary portion 2, the shaft 31, the hub 32, and the annular member 33, which are members of the rotating portion 3, and the lubricating fluid, which is arranged to intervene therebetween. The bearing mechanism 15 is located in the through hole of the cylindrical portion 211. The rotating portion 3 is supported by the bearing mechanism 15, and is arranged to rotate about the rotation axis 9.

The magnet 34 is fixed to an inside surface of the hub 32. The magnet 34 is arranged radially opposite the stator 22. The magnet 34 according to the present preferred embodiment is annular. An inner circumferential surface of the magnet 34 is radially opposed to a radially outer end surface of each of the teeth 411. In addition, the magnet 34 is polarized such that north and south poles are arranged alternately in the circumferential direction.

Note that, in place of the annular magnet 34, a plurality of magnets may alternatively be arranged inside the hub 32. In this case, the plurality of magnets are preferably arranged on an inner circumferential surface of the hub 32 such that north and south poles are arranged alternately in the circumferential direction.

Regarding the spindle motor 11 as described above, once the electrical drive currents are supplied to the coils 42 through the circuit board 24, magnetic flux is generated around the plurality of teeth 411. Then, interaction between the magnetic flux of the teeth 411 and that of the magnet 34 produces a circumferential torque, so that the rotating portion 3 is caused to rotate about the rotation axis 9 with respect to the stationary portion 2 together with the magnetic disk 12.

Figure 4:
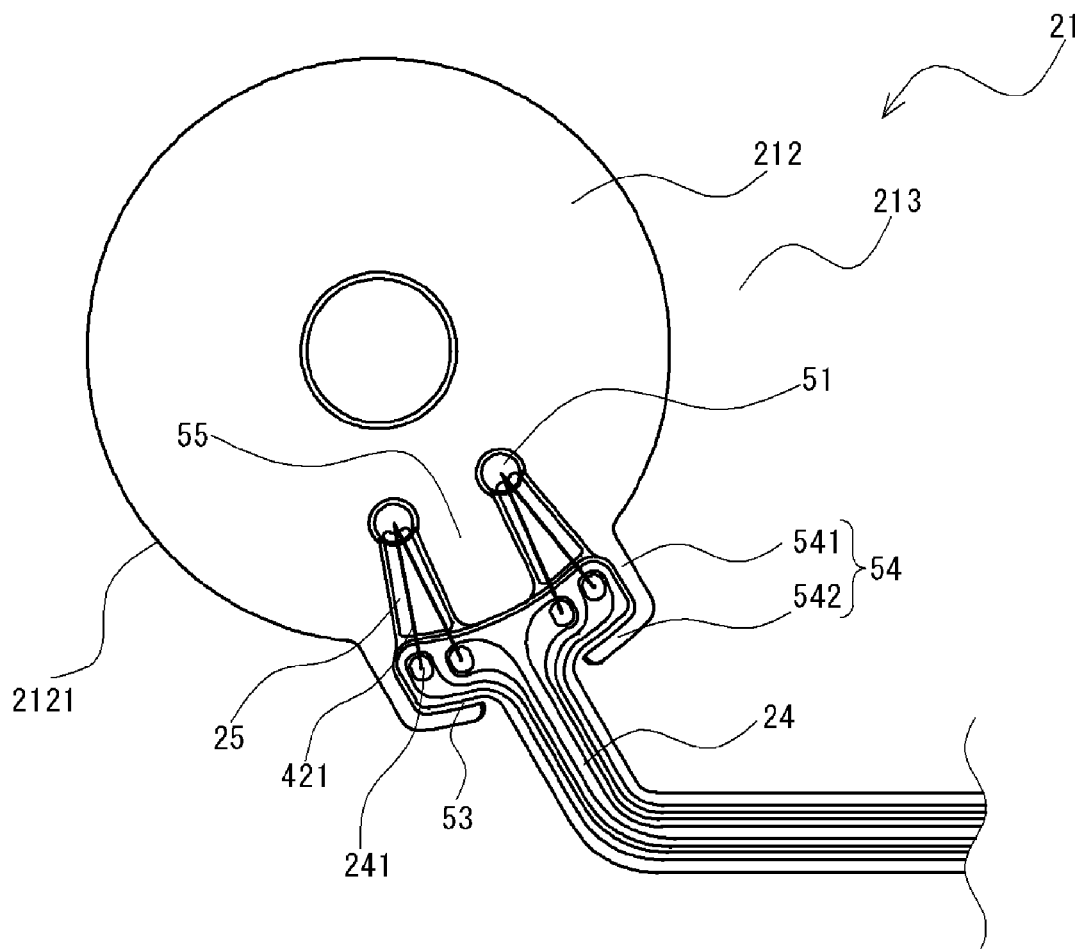
FIG. 4 is a partial enlarged view of a lower surface of a base member according to the first preferred embodiment of the present invention.

Next, routing of the lead wires 421 from the coils 42 to the land portions 241 will now be further described below. FIG. 3 is a partial vertical cross-sectional view of the spindle motor 11. FIG. 4 is a partial bottom view of the base member 21. Note that, in FIG. 4, an adhesive 29 is not shown.

As illustrated in FIG. 3, at least portions of a surface of the base member 21 are preferably coated with insulating layers 28. Each insulating layer 28 is preferably defined, for example, by applying a resin made of an insulating material to the surface of the base member 21 through an electro-deposition coating. Note that the insulating layer 28 may be defined by another method, such as, for example, powder coating. As illustrated in FIG. 3, in a central portion of the base member 21, at least a lower surface of the middle region 212, a lower surface of the peripheral region 213, and an upper surface of the peripheral region 213 are coated with the insulating layers 28.

In addition, the base member 21 preferably includes the two through holes 51, groove portions 52, and a recessed portion 53. Each through hole 51 is arranged in the middle region 212, and is located below the stator 22. As described above, the through hole 51 is arranged to pass through the base member 21 in a thickness direction thereof. More specifically, the through hole 51 is arranged to pass through the middle region 212 in the axial direction.

In addition, an inner circumferential surface of each through hole 51 is preferably coated with the insulating layer 28. This prevents a contact of any lead wire 421 passing through the through hole 51 with the inner circumferential surface of the through hole 51 from causing a short circuit.

As illustrated in FIG. 3, the groove portions 52 and the recessed portion 53 are arranged in the lower surface of the base member 21. Each groove portion 52 is recessed axially upward in the lower surface of the base member 21. Each groove portion 52 is arranged to extend radially outward from an outer circumferential edge of an inside surface of one of the through holes 51. The recessed portion 53 is arranged radially outward of each groove portion 52. Each groove portion 52 is in communication with the recessed portion 53. That is, one end of each groove portion 52 is joined to one of the through holes 51 while another end of the groove portion 52 is joined to the recessed portion 53. At least a portion of a bottom surface and wall surfaces of each groove portion 52 is preferably coated with the insulating layer 28. This prevents any lead wire 421 from making direct contact with the bottom surface or the wall surfaces of the groove portion 52. This prevents the lead wire 421 from experiencing a short circuit in the groove portion 52. Note that each through hole 51 may be arranged to pass through the base member 21 in a radial direction.

As described above, the circuit board 24 is arranged on the lower surface of the base member 21. At least a portion of the circuit board 24 is arranged in the recessed portion 53. The circuit board 24 is arranged to extend radially outward from an inside of the recessed portion 53. Preferably, the land portions 241 of the circuit board 24 are accommodated in the recessed portion 53.

The first insulation sheet portion 25 is preferably arranged in each groove portion 52. The first insulation sheet portion 25 is arranged to extend toward the recessed portion 53 away from the through hole 51 in the groove portion 52. A radially inner end portion of the first insulation sheet portion 25 is preferably positioned in the through hole 51. The first insulation sheet portion 25 is fixed to the bottom surface in the groove portion 52 through, for example, an adhesive or a gluing agent. In addition, the second insulation sheet portion 26 is preferably arranged on the upper surface of the middle region 212. The second insulation sheet portion 26 is preferably annular or substantially annular, surrounding the cylindrical portion 211. The second insulation sheet portion 26 is preferably fixed to the upper surface of the middle region 212 through an adhesive or a gluing agent.

Note that each first insulation sheet portion 25 may be a portion of the circuit board 24. Specifically, a portion of the circuit board 24 may be arranged to extend into each groove portion 52 to define the first insulation sheet portion 25. An insulating bushing may alternatively be used in place of the second insulation sheet portion 26, if so desired. Even in this case, the insulating bushing is preferably arranged to cover the upper surface of the middle region 212. In addition, a portion of the insulating bushing may be arranged in each through hole 51.

A resin, such as, for example, polyethylene terephthalate (PET) or the like, which is an insulating material, is preferably used as a material of each of the first insulation sheet portions 25 and the second insulation sheet portion 26, for example. Each of the first insulation sheet portions 25 and the second insulation sheet portion 26 is arranged to have a thickness greater than that of each insulating layer 28 and smaller than that of a portion of the circuit board 24 which surrounds each land portion 241.

Note that at least a portion of the surface of the base member 21 may be coated with a plating layer. In this case, each first insulation sheet portion 25 is preferably arranged to have a thickness greater than that of the plating layer.

The second insulation sheet portion 26 is arranged to intervene between the middle region 212 and the coils 42. A contact between the base member 21 and the coils 42 is thereby prevented. Accordingly, electrical isolation is established between the base member 21 and the coils 42. In addition, intervention of the second insulation sheet portion 26 between the middle region 212 and the coils 42 enables the middle region 212 to be arranged closer to the coils 42 in the axial direction. This contributes to further reducing the axial thickness of the spindle motor 11.

As illustrated in FIG. 3, each lead wire 421 is preferably arranged to extend from above the middle region 212 into a corresponding one of the through holes 51. The lead wire 421 is drawn out of a corresponding one of the coils 42 at a position radially inward of a center of the through hole 51. The lead wire 421 is drawn out of the coil 42 into a corresponding one of the groove portions 52 through the through hole 51.

As described above, the second insulation sheet portion 26 is arranged to intervene between the middle region 212 and the coils 42. At least a portion of a radially outer end portion of the second insulation sheet portion 26 is arranged in each through hole 51. Therefore, the second insulation sheet portion 26 is arranged to intervene between the middle region 212 and each lead wire 421. This prevents the lead wire 421 from making direct contact with an upper opening edge of the through hole 51 of the middle region 212.

In addition, as described above, the first insulation sheet portion 25 is arranged in each groove portion 52. The first insulation sheet portion 25 is arranged to intervene between the lead wires 421 and the groove portion 52. In the groove portion 52, each lead wire 421 is arranged to extend radially outward along a lower surface of the first insulation sheet portion 25. Then, an end portion of the lead wire 421 on an opposite side is soldered to a corresponding one of the land portions 241 of the circuit board 24 at a position radially outward of the middle region 212.

As described above, each lead wire 421 drawn out downwardly of the lower surface of the middle region 212 is preferably accommodated in a corresponding one of the groove portions 52. Each groove portion 52 is arranged to have an axial depth greater than the sum of the thickness of the insulating layer 28, the thickness of the first insulation sheet portion 25, and the diameter of each lead wire 421. This reduces the likelihood that the lead wire 421 will protrude out of the groove portion 52. As a result, a reduction in the axial thickness of the spindle motor 11 is achieved.

Note that the diameter of each lead wire 421 mentioned above refers to the diameter of a cross section of a combination of both a bare wire of the lead wire 421 and a protective film with which the bare wire is coated.

As described above, the first insulation sheet portion 25 is preferably arranged to intervene between the lead wires 421 and each groove portion 52. The second insulation sheet portion 26 is preferably arranged to intervene between the middle region 212 and each lead wire 421. This prevents the base member 21 from making contact with any lead wire 421. Electrical isolation between the base member 21 and each lead wire 421 is thereby established. In particular, in this preferred embodiment, a radially inner portion of the first insulation sheet portion 25 is arranged to overlap with an end portion of a lower opening of the through hole 51 in a plan view. Moreover, a radially outer portion of the second insulation sheet portion 26 is arranged to overlap with an end portion of an upper opening of each through hole 51 in the plan view. This prevents the base member 21 from making contact with any lead wire 421.

Note that each lead wire 421 drawn out of a corresponding one of the coils 42 preferably includes the bare wire and the protective film (not shown), which is made of an insulating material and with which the bare wire is coated. This protective film is easily damaged if it is brought into contact with a material having high rigidity, such as a metal or the like. The rigidity of the base member 21 is higher than that of each first insulation sheet portion 25 and that of the second insulation sheet portion 26. In this preferred embodiment, each lead wire 421 is arranged to be in contact with the first insulation sheet portion 25 and the second insulation sheet portion 26. This reduces the likelihood that the protective film will be damaged. Moreover, even if the protective film of any lead wire 421 is damaged, the lead wire 421 preferably never makes contact with the base member 21. Furthermore, each of the first insulation sheet portions 25 and the second insulation sheet portion 26 is made of the insulating material. This reduces the likelihood that the lead wire 421 and the base member 21 will come into electrical connection with each other.

In addition, as illustrated in FIG. 3, the stationary portion 2 preferably further includes the adhesive 29. Each through hole 51 is preferably sealed with the adhesive 29. This prevents gas from entering into or exiting out of the disk drive apparatus 1 through the through hole 51. An improvement in airtightness of the disk drive apparatus 1 is thereby achieved. Moreover, the lead wires 421 are fixed in each through hole 51 through the adhesive 29. This reduces the likelihood that any lead wire 421 will protrude below the lower surface of the middle region 212.

In addition, in this preferred embodiment, the adhesive 29 is preferably arranged not only in each through hole 51 but also in each groove portion 52 and the recessed portion 53. A greater area of each lead wire 421 is thereby covered with the adhesive 29, and the lead wire 421 is fixed in the groove portion 52 and the recessed portion 53. This reduces the likelihood that any lead wire 421 will protrude below the lower surface of the middle region 212.

In this preferred embodiment, each groove portion 52 is preferably arranged to have an axial depth greater than the sum of the thickness of the insulating layer 28, the thickness of the first insulation sheet portion 25, the diameter of each lead wire 421, and the thickness of the adhesive 29 applied. This prevents the adhesive 29 from protruding below the groove portion 52. More preferably, the bottom surface of each groove portion 52 is positioned at an axial level higher than an axial level of the lower surface of the middle region 212 and lower than an axial level of a bottom portion of the recessed portion 53. This prevents the adhesive from protruding out of any of the groove portions 52 and the recessed portion 53.

Note that another sealant may be used in place of the adhesive 29, if so desired. For example, a resin material other than the adhesive may alternatively be used as the sealant.

FIG. 4 is a partial enlarged view illustrating the lower surface of the base member 21. As illustrated in FIG. 4, the base member 21 preferably includes jetty portions 54 and a wall portion 55. An outer circumferential portion 2121 of the middle region 212 preferably includes a portion in the shape of a circular arc.

In the lower surface of the base member 21, at least one jetty portion 54 is arranged to extend radially outward from the middle region 212. In this preferred embodiment, two jetty portions 54 are preferably provided. Preferably, each jetty portion 54 is arranged to extend radially outward from the portion of the outer circumferential portion 2121 which is in the shape of the circular arc. More preferably, the outer circumferential portion 2121 of the middle region 212 includes a portion in the shape of a major arc, and a pair of extension portions 541 of the jetty portions 54 are arranged to extend from a pair of end portions of the portion in the shape of the major arc.

The jetty portions 54 include the extension portions 541 and a plurality of arm portions 542. The jetty portions 54 are preferably positioned at least below the peripheral region 213. In this preferred embodiment, each jetty portion 54 is a portion of the middle region 212. That is, in the lower surface of the base member 21, each jetty portion 54 is preferably flush or substantially flush with the middle region 212. In the base member 21, each jetty portion 54 is arranged to project downwardly from an outer circumferential edge of the recessed portion 53. Note that each jetty portion 54 may alternatively be not necessarily flush with the middle region 212, if so desired.

Each of the pair of extension portions 541 is preferably continuous with the middle region 212, and is arranged to extend in a direction away from the rotation axis 9. In this preferred embodiment, each extension portion is arranged to extend radially outward from the middle region 212. Each of the arm portions 542 is arranged to extend from a tip portion of a separate one of the pair of extension portions 541 in a direction different from a direction in which a corresponding one of the extension portions 541 extends. In this preferred embodiment, each arm portion 524 is preferably arranged to extend in the circumferential direction from the tip portion of the corresponding extension portion. In addition, the arm portions 542 are arranged circumferentially opposite each other. That is, the arm portions 542 are preferably arranged to extend from the tip portions of the extension portions 541 in such directions that they approach each other.

As described above, the recessed portion 53 is arranged radially outward of the through holes 51. As illustrated in FIG. 4, the recessed portion 53 is arranged radially outside the middle region 221. The recessed portion 53 is preferably defined in a region surrounded by the jetty portions 54, the wall portion 55, and the groove portions 52 in the lower surface of the base member 21. The jetty portions 54 are arranged to cover at least a portion of the outer circumferential edge of the recessed portion 53. In more detail, the pair of extension portions 541 are arranged circumferentially opposite each other with the recessed portion 53 intervening therebetween. The arm portions 542 are arranged radially opposite the groove portions 52 and the wall portion 55 with the recessed portion 53 intervening therebetween.

The recessed portion 53 is arranged to have a circumferential width smaller than a circumferential distance between the pair of extension portions 541. As described above, a radially outer opening portion of each groove portion 52 is in communication with the recessed portion 53. This opening portion of each groove portion 52 is positioned circumferentially between the extension portions 541. At least one of these opening portions is arranged radially opposite at least one of the arm portions 542 with the recessed portion 53 intervening therebetween.

At least a portion of a periphery of the recessed portion 53 is surrounded by the extension portions 541 and the arm portions 542. In other words, the recessed portion 53 is arranged inside the jetty portions 54. A bottom surface of the recessed portion 53 is preferably positioned at an axial level higher than an axial level of the lower surface of the peripheral region 213. As described above, in the lower surface of the base member 21, the jetty portions 54 are preferably flush or substantially flush with the middle region 212. In the base member 21, the jetty portions 54 are arranged to project downwardly of the outer circumferential edge of the recessed portion 53. This prevents the adhesive 29 in the recessed portion 53 from overflowing across any jetty portion 54 into the peripheral region 213.

Note that the jetty portions 54 may alternatively be provided separately from the middle region 212. One of the jetty portions 54 may be a portion of the middle region 212 with the other jetty portion 54 provided separately from the middle region 212. Also note that each jetty portion 54 may be defined by a plurality of portions.

As described above, a portion of the circuit board 24 is arranged in the recessed portion 53. In more detail, a portion of the circuit board 24 which includes the land portions 241 is arranged in the recessed portion 53. This portion of the circuit board 24 is preferably arranged to have an external shape identical or substantially identical to that of the recessed portion 53. In this preferred embodiment, this portion is in the shape of a portion of a ring extending in the circumferential direction. Each lead wire 421 is preferably drawn out through one of the through holes 51, is extended in a corresponding one of the groove portions 52, and is connected to a corresponding one of the land portions 241 arranged in the recessed portion 53. At least one of the land portions 241 is arranged radially opposite the radially outer opening portion of at least one of the groove portions 52. This allows the lead wire 421 to be extended from the through hole 51 to the land portion 241 by the shortest possible distance. This leads to a reduction in the length of the lead wire 421 and a reduction in a cost. Moreover, the lead wire 421 is preferably prevented from sagging and protruding out of the groove portion 52.

Each arm portion 542 is positioned in a longitudinal direction of a separate one of the groove portions 52. In the recessed portion 53, at least one of the land portions 241 is arranged radially opposite at least one of the arm portions 542. In this preferred embodiment, two of the land portions 241 are preferably arranged radially opposite each one of the arm portions 542. The land portions 241 are preferably arranged between the arm portions 542 and a portion of an outer circumferential edge of the middle region 212 which is in the shape of a circular arc.

As illustrated in FIG. 4, the circuit board 24 is extended out of the recessed portion 53 in a direction away from the rotation axis 9 through a gap between the arm portions 542 opposed to each other. In addition, a tip of each arm portion 542 is preferably circumferentially spaced from the circuit board 24. This makes it easier to arrange the circuit board 24 at a predetermined position on the base member 21 when the motor 11 is assembled.

The wall portion 55 is arranged between the plurality of through holes 51. In this preferred embodiment, the wall portion 55 is preferably a portion arranged between the groove portions 52 adjacent to each other. The wall portion 55 is a portion of the middle region 212. In this preferred embodiment, the number of through holes 51 is two. Therefore, only one wall portion 55 is arranged.

Note that the number of wall portions 55 is not limited to one, but a plurality of wall portions 55 may be arranged in the middle region 212. Also in this preferred embodiment, a plurality of wall portions 55 may be arranged between the groove portions 52 adjacent to each other. Also note that the number of groove portions 52 may be more than two, and that the wall portion 55 may be arranged between each pair of groove portions 52 adjacent to each other, if so desired. That is, the plurality of wall portions 55 may be arranged in accordance with the number of through holes 51 and the number of groove portions 52.

Both circumferential side portions of the wall portion 55 (that is, side surfaces of the groove portions 52 adjacent to each other) are preferably arranged to be parallel or substantially parallel to each other. The circumferential width of each groove portion 52 is arranged to gradually increase in a radially outward direction. In more detail, one side surface of the groove portion 52 is arranged to become increasingly more distant from the other side surface thereof defining the wall portion 55 in the radially outward direction. In FIG. 4, one of the groove portions 52 may be arranged to have an external shape either similar to or different from that of the other groove portion 52.

While one exemplary preferred embodiment of the present invention has been described above, the present invention is not limited to the above-described preferred embodiment. In the following description, a description of any structure which is the same or substantially the same as a corresponding structure described above is omitted.

Figure 5:
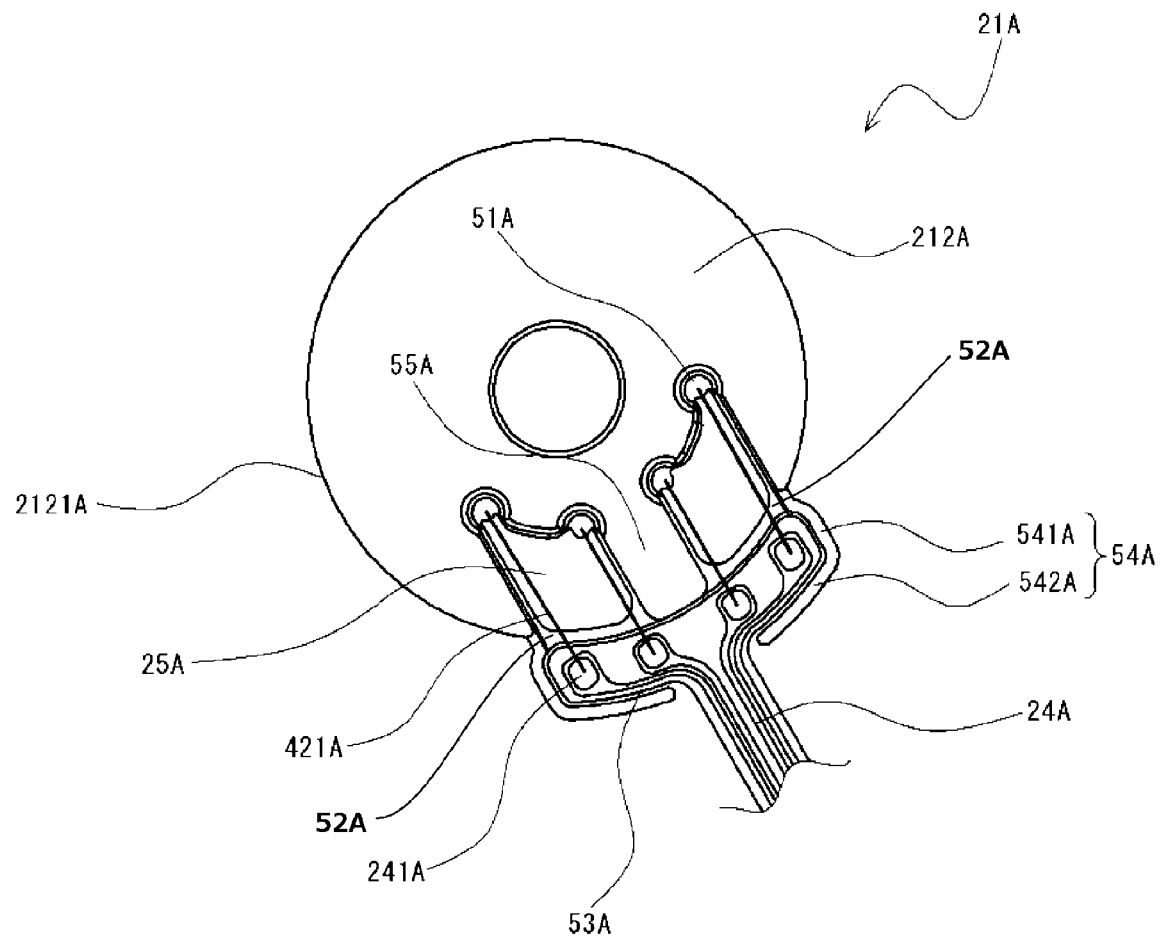
FIG. 5 is a partial enlarged view of a lower surface of a base member according to another preferred embodiment of the present invention.

In the preferred embodiment described above, preferably only one through hole 51 is joined to each groove portion 52. However, a plurality of through holes 51 may be provided for each groove portion 52. FIG. 5 is a partial enlarged view illustrating a lower surface of a base member 21A according to another preferred embodiment of the present invention.

In FIG. 5, the number of through holes 51A is preferably four. The through holes 51A are arranged in the circumferential direction with a rotation axis as a center. Preferably, only one lead wire 421A is passed through each through hole 51A. Note that a plurality of lead wires 421A may alternatively be passed through any one of the through holes 51A, if so desired. Also note that jetty portions 54A may not be defined integrally with a middle region 212A, if so desired.

In FIG. 5, the number of groove portions 52A is preferably two. As in the above-described preferred embodiment, one wall portion 55A is preferably arranged between the groove portions 52A adjacent to each other. A plurality of through holes 51A are in communication with a first groove portion 52A (on a left-hand side in FIG. 5). A plurality of through holes 51A are in communication with a second groove portion 52A (on a right-hand side in FIG. 5) as well. In this preferred embodiment, two of the four through holes 51A are joined to one of the two groove portions 52A, while the other two of the four through holes 51A are joined to the other of the two groove portions 52A. That is, two of the through holes 51A are joined to each one of the groove portions 52A. In other words, a pair of through holes 51A are joined to each one of the groove portions 52A.

As in the above-described preferred embodiment, a first insulation sheet portion 25A is preferably arranged in each groove portion 52A. Each first insulation sheet portion 25A is preferably arranged to have an external shape identical or substantially identical to that of a corresponding one of the groove portions 52A when viewed in the axial direction. This prevents each lead wire 421A from making direct contact with a corresponding one of the groove portions 52A, as in the above-described preferred embodiment.

As in the above-described preferred embodiment, each groove portion 52A is preferably joined to a recessed portion 53A. A portion of a circuit board 24A which includes land portions 241A is arranged in the recessed portion 53A. The through holes 51A are arranged opposite to the land portions 241A with the groove portions 52A intervening therebetween.

Two side surfaces of the wall portion 55A are preferably arranged to be parallel or substantially parallel to each other. Side surfaces of each groove portion 52A which are opposed to each other are also preferably arranged to be parallel or substantially parallel to each other. That is, in FIG. 5, the side surfaces of the groove portions 52A are arranged to be parallel or substantially parallel to one another.

Accordingly, each lead wire 421A drawn out through a corresponding one of the through holes 51A is drawn in a substantially straight line to a corresponding one of the land portions 241A, an disconnected to the land portion 241A. This minimizes the length of a portion of each lead wire 421A which extends in each groove portion 52A, and leads to a reduction in a cost. In addition, each lead wire 421A is prevented from sagging in the groove portion 52A, and the lead wire 421A is prevented from protruding out of the groove portion 52A.

In addition, the circumferential distance between the pair of land portions 241A which are close to the wall portion 55A is arranged to be greater than the circumferential distance between the land portions 421A to which the pair of lead wires 421A which pass in each groove portion 52A are connected.

In FIG. 5, each jetty portion 54A is a portion arranged separately from the middle region 212A. Each jetty portion 54A is preferably positioned at an axial level lower than an axial level of a peripheral region 213A, and is positioned at an axial level higher than an axial level of the middle region 212A. Each of the two jetty portions 54A preferably includes an extension portion 541A and an arm portion 542A. Each extension portion 541A is arranged to extend from a vicinity of an outer circumferential edge 2121A of the middle region 212A in a direction away from the rotation axis. Each arm portion 542A is arranged to extend from one of the extension portions 541A toward the other extension portion 541A. That is, the pair of arm portions 542A are preferably arranged circumferentially opposite each other. At least a portion of the circuit board 24A is arranged in a circumferential gap between the pair of arm portions 542A. This portion is radially opposed to the wall portion 55A.

As in the above-described preferred embodiment, the two jetty portions 54A are arranged to surround at least a portion of a periphery of the recessed portion 53A. The jetty portions 54A accordingly preferably prevent an adhesive 29 from flowing out of the recessed portion 53A.

Note that, in each above-described preferred embodiment or the like, a rigid board or the like, instead of the flexible printed circuit board, may be used as the circuit board 24, for example.

In each above-described preferred embodiment or the like, the shaft 31 and the rotor hub 32 are preferably defined by separate members. However, the shaft 31 and the rotor hub 32 may be defined by a single monolithic member, if so desired.

The motor according to the above-described preferred embodiment is preferably a so-called shaft-rotating motor in which the shaft 31 is arranged to rotate together with the rotating portion 3. However, a motor according to another preferred embodiment of the present invention may be a fixed-shaft motor in which the shaft 31 is fixed to the stationary portion 2.

Motors according to preferred embodiments of the present invention are applicable to hard disk drive apparatuses, optical disk drive apparatuses, and so on. Besides, motors according to preferred embodiments of the present invention may be arranged to rotate not only magnetic disks or optical disks but also color wheels or the like.

Motors according to preferred embodiments of the present invention are also usable as motors used in other applications than disk drive apparatuses. For example, motors according to preferred embodiments of the present invention are also usable as motors designed to rotate impellers of fans or the like.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A spindle motor comprising:
    a stationary portion; and
    a rotating portion configured to be rotatable about a rotation axis extending in a vertical direction with respect to the stationary portion; wherein
    the stationary portion includes:
        a base member extending in directions perpendicular to the rotation axis;
        a stator core positioned axially above the base member;
        coils attached to the stator core, and including lead wires; and
        a circuit board located on a lower surface of the base member;
    the base member includes:
        a middle region which is a flat surface which surrounds the rotation axis;
        an outer circumferential portion positioned radially outside the middle region, the outer circumferential portion being an arc extending more than 180° around the middle region to define a major arc;
        a peripheral region positioned radially outside the middle region, and positioned axially above the middle region;
        jetty portions including a pair of extension portions, each of which is continuous with the middle region and extends in a direction away from the rotation axis, and arm portions, each of which extends from a tip portion of a separate one of the pair of extension portions in a direction different from a direction in which a corresponding one of the extension portions extends, the jetty portions are positioned at least axially below the peripheral region, and a portion of the jetty portion positioned at least radially outside the outer circumferential portion;
        a recessed portion located inside the jetty portions, and in which a portion of the circuit board is provided; and
        at least one through hole positioned radially inward of the outer circumferential portion which passes through the middle region in an axial direction;
    the lead wires of the coils are passed through the at least one through hole to reach a lower side of the base member, and are electrically connected to the circuit board; and
    the recessed portion is covered with a sealant.

2. The spindle motor according to claim 1, wherein each jetty portion is a portion of the middle region.

3. The spindle motor according to claim 1, wherein
the middle region further includes at least one groove portion; and
one end of each of the at least one groove portion is joined to at least one of the at least one through hole, while another end of the groove portion is joined to the recessed portion.

4. The spindle motor according to claim 3, wherein a bottom surface of each of the at least one groove portion is positioned at an axial level higher than an axial level of a lower surface of the middle region and lower than an axial level of a bottom portion of the recessed portion.

5. The spindle motor according to claim 1, wherein
the at least one through hole is more than one in number; and
the base member further includes a wall portion arranged between the through holes.

6. The spindle motor according to claim 5, wherein
the middle region further includes two groove portions;
the at least one through hole is four in number, and the wall portion is arranged between the groove portions;
two of the four through holes are joined to one of the two groove portions; and
other two of the four through holes are joined to another one of the two groove portions.

7. The spindle motor according to claim 1, wherein a bottom surface of the recessed portion is positioned at an axial level higher than an axial level of a lower surface of the peripheral region.

8. The spindle motor according to claim 1, wherein only one of the lead wires is passed through each of the at least one through hole.

9. The spindle motor according to claim 1, wherein portions of the circuit board at which the circuit board and the lead wires are electrically connected to each other are arranged in the recessed portion.

10. A disk drive apparatus on which a disk is mounted, the disk drive apparatus comprising:
the spindle motor of claim 1;
an access portion arranged to perform at least one of reading and writing of information from or to the disk; and
a housing arranged to accommodate the spindle motor and the access portion.

* * * * *